(No Model.)

W. M. FARR.
SAND BAND FOR VEHICLES.

No. 273,832. Patented Mar. 13, 1883.

Attest.
John C Perkins
Sarah M Farr

Inventor:
Willis M Farr
By Roscoe B Shuler
Atty.

UNITED STATES PATENT OFFICE.

WILLIS M. FARR, OF DOWAGIAC, MICHIGAN.

SAND-BAND FOR VEHICLES.

SPECIFICATION forming part of Letters Patent No. 273,832, dated March 13, 1883.

Application filed September 30, 1882. (No model.)

*To all whom it may concern:*

Be it known that I, WILLIS M. FARR, of the city of Dowagiac, county of Cass, and State of Michigan, have invented a certain Improvement in Protectors for Hubs and Axles of Vehicles, of which the following is a specification.

My invention relates to that class of inventions known as "protectors for the hub and axle of vehicles," being designed to protect the wearing parts from sand, mud, dust, and the like while the vehicle is in use.

The object of my invention is to construct a cheap, durable, and practical protector, one that may be readily attached to any kind of a vehicle, regardless of its style or make, being able to protect the wearing parts from grit, making the vehicle more durable and to run easier, and at the same time requiring less oil than in the usual way.

In order to aid others skilled in the art to which my invention belongs to make and use it, I will proceed to describe its construction and operations, with reference to the several drawings, forming a part of this specification, in which—

Figure 1:
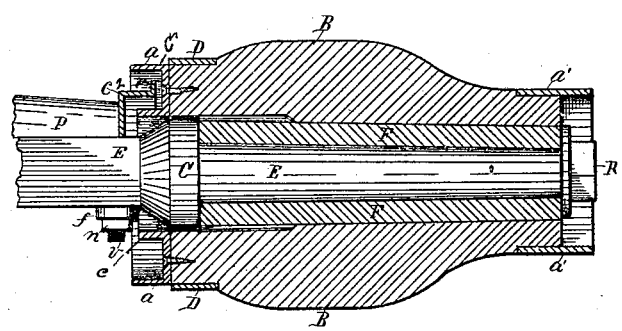

Figure 1 is a longitudinal sectional view of the hub of a vehicle and cross-sectional view of my invention attached thereto. Figs. 2, 3, 4, and 5 are detached views of my invention, all of which will be hereinafter described.

In the drawings, Fig. 1, B is the hub; E, the axle; R, the nut securing the hub to the axle; C, shoulder to the axle. D is a band around the end of the hub.

Figure 2:
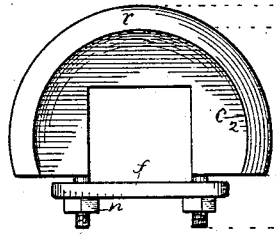
Figure 3:
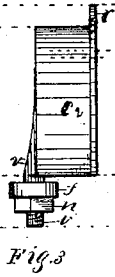
Figures 4, 5:
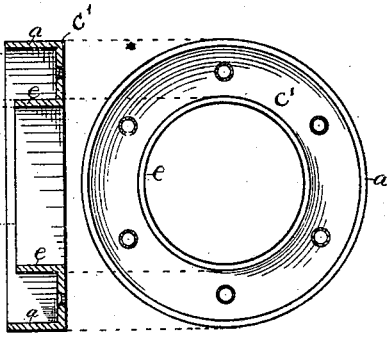

I attach to the inner end of the hub a metal ring or plate, C', which is secured to the hub by means of nails or screws through the series of holes shown in Fig. 5. Passing over the square portion of the axle is a metal shell or box, $C^2$, having a square opening in its perpendicular portion, (see Fig. 2,) into which the square portion of the axle lies. (See Fig. 1.) Two pintles project downward from the shell to receive the clip-tie $f$, which secures the parts to the axle by means of the nuts $n$. The shell $C^2$ is circular on its upper portion, being perfectly straight on its under side. (See Figs. 1 and 2.) Cast onto the perpendicular portion at right angles is a concavo-convex part. (See Figs. 1 and 3.) Around the periphery of the concavo-convex portion is an upward-projecting flange, $r$. (See Figs. 1, 2, and 3.) The metal plate C' attached to the hub has two projecting rims, $c$ and $a$. (See Figs. 1 and 4.) Fig. 4 is a cross-sectional view of the plate C', and Fig. 5 is a face view of the same. Fig. 2 is a face view of the shell $C^2$ with flange $r$, and Fig. 3 is an edge view of same, giving a side view of the projecting concavo-convex portion and edge view of its flange $r$, the shell $C^2$ being secured to the axle E with its open end outward. The hub having the double-rimmed plate is then shoved upon the axle to its position shown in Fig. 1, when the concavo-convex portion of the shell with its upward-projecting flange $r$ enters the space between the rims $c$ and $a$ of the plate C', as shown in Fig. 1.

The object of the construction of parts is for the following purposes: Sand, mud, and the like collecting upon the hub will drop over the outer rim, $a$, upon the concavo-convex portion of the shell $C^2$, and will be prevented from working over the inner end upon the wearing parts of the axle by the upward-projecting flange $r$; or should any substance work over the flange $r$ it will be prevented from coming in contact with the working or wearing parts of the hub and axle by the inner projecting rim, $c$, all of which is clearly shown in Fig. 1.

I am aware of the patent to Hill, July 8, 1879; also, the patent to Faglebach, June 11, 1878, sand-bands, and claim nothing contained therein.

Having described my invention as fully as I can, what I claim as new, and desire to secure by Letters Patent, is—

In a sand-protector for vehicles, the combination of the axle E with shell $C^2$, having a concavo-convex upper portion with a vertical flange, $r$, said flange having vertical sides, said shell having pintles and being secured to the axle by the clip-tie $f$ and nuts, said shell and its parts constituting one piece with the flange $r$ and concavo-convex portion fitting within the space between the parallel horizontal flanges $c$ and $a$ on the vertical ring C', attached to the end of the hub, substantially as shown and described.

WILLIS M. FARR.

Witnesses:
R. B. WHEELER,
SARAH M. FARR.